United States Patent [19]
Martucci et al.

[11] Patent Number: 5,764,805
[45] Date of Patent: Jun. 9, 1998

[54] LOW BIT RATE VIDEO ENCODER USING OVERLAPPING BLOCK MOTION COMPENSATION AND ZEROTREE WAVELET CODING

[75] Inventors: Stephen Anthony Martucci, Grass Valley, Calif.; Iraj Sodagar, Princeton; Ya-Qin Zhang, Cranbury, both of N.J.

[73] Assignee: David Sarnoff Research Center, Inc., Princeton, N.J.

[21] Appl. No.: 735,871

[22] Filed: Oct. 23, 1996

Related U.S. Application Data

[60] Provisional application No. 60/007,013, Oct. 25, 1995.

[51] Int. Cl.$^6$ ............................................. G06K 9/00
[52] U.S. Cl. ............................................. 382/238; 382/236
[58] Field of Search ................................. 382/284, 294, 382/232, 233, 234, 235, 236, 238, 239, 240, 241, 242, 243, 244, 245, 248, 249, 250, 251, 252, 253, 279, 280, 281; 341/67, 106; 348/416, 699, 415, 409, 607, 588, 407, 398; 358/426

[56] References Cited

U.S. PATENT DOCUMENTS

| | | | |
|---|---|---|---|
| 5,253,058 | 10/1993 | Gharavi | 358/136 |
| 5,311,310 | 5/1994 | Jozawa et al. | 348/416 |
| 5,355,378 | 10/1994 | Ohta | 371/53 |
| 5,412,741 | 5/1995 | Shapiro | 382/232 |
| 5,477,272 | 12/1995 | Zhang et al. | 348/407 |
| 5,495,292 | 2/1996 | Zhang et al. | 348/407 |
| 5,642,166 | 6/1997 | Shin et al. | 348/416 |
| 5,646,618 | 7/1997 | Walsh | 341/67 |
| 5,649,032 | 7/1997 | Burt et al. | 382/284 |

OTHER PUBLICATIONS

Copy of International Search Report dated Mar. 5, 1997, from corresponding international application. No Page # or Author or Place of Public Applicable.

*Primary Examiner*—Leo Boudreau
*Assistant Examiner*—Bijan Tadayon
*Attorney, Agent, or Firm*—William J. Burke

[57] ABSTRACT

An apparatus and a concomitant method for encoding video frame sequences (input images) using overlapping block motion compensation in conjunction with zerotree wavelet coding. The method partitions each input image into a plurality of overlapping blocks and applies wavelet transform on the partitioned input image. Various optional quantization processes can be selectively applied to determine an optimal quantizer scale for each wavelet coefficient. Zerotree coding is then optionally applied to selectively prune the wavelet coefficients. Finally, the quantized coefficients are encoded into a bitstream.

20 Claims, 7 Drawing Sheets

LOW BIT RATE VIDEO ENCODER USING OVERLAPPING BLOCK MOTION COMPENSATION AND ZEROTREE WAVELET CODING

This application claims the benefit of U.S. Provisional application Ser. No. 60/007,013 filed Oct. 25, 1995.

The invention relates to video signal encoding systems and, more particularly, to apparatus and concomitant methods of encoding video signals using overlapping block motion estimation compensation and zerotree wavelet coding.

BACKGROUND OF THE DISCLOSURE

Standardized, block-based video signal encoding techniques such as the standards promulgated by the Moving Pictures Experts Group (MPEG); namely, ISO/IEC international standards 11172 (1991) (generally referred to as MPEG-1) and 13818 (Jan. 20, 1995 draft) (generally referred to as MPEG-2), use block motion estimation compensation to remove inter-frame redundancy from successive image frames within a video signal. The standards specify the use of non-overlapping rectangular blocks of image pixels from successive frames to generate a set of motion vectors that represent inter frame motion. Systems implementing these standards require coding of the motion vectors and any residual differences between successive frames that are not represented by the motion vector compensation. With the inter frame redundancies substantially eliminated, sequences of images (e.g., video) can be coded with relatively few bits. For this reason, block motion compensation techniques have found wide use in the art of video compression.

All operations in block-based motion compensation systems are accomplished on a block-by-block basis. As these operations are applied to each block independently, the neighboring motion vectors are not always the same. Consequently, the system produces discontinuities (in the form of blocking edges) in residuals. Such discontinuities are difficult to code and can use a substantial number of coding bits.

In conventional block-based coding systems, a block-based transform such as DCT is applied to the residuals. Generally, the same block segmentation size and shape used for motion compensation, is also used for the transform computation. Therefore, the discontinuities of the residuals do not reduce the coding efficiency. However, these blocking edges increase the blocking effects in the decoded sequence.

One improvement to the standard block motion compensation systems used to address the blocking effect involves using rectangular blocks of pixels that slightly overlap with one another, i.e., any two adjacent blocks overlap by one or more pixels. Such block overlap reduces the discontinuities in the residuals and improves the blocking effect.

Although the various standard techniques for coding inter frame redundant information (i.e., temporally redundant information), are adequate, they do not address optimal coding of the intra frame redundancies (i.e., spatially redundant information).

Recently there has been developed a coding technique that finds use in coding still (photographic) images. This technique is useful at removing intra frame information redundancy and for efficiently coding a single frame of an image. The technique is disclosed in U.S. Pat. No. 5,412,741, issued May 2, 1995 and herein incorporated by reference, which describes using the discrete wavelet transform (DWT) in deriving embedded zerotree wavelets (EZW) to form an hierarchical image representation. This hierarchical representation is then efficiently coded using entropy coding.

Heretofore, the zerotree wavelet coding technique has not been combined with a overlapping block motion compensation technique such that sequences of images can be efficiently coded by compressing both the inter-frame and intra-frame redundancies.

Therefore, there is a need in the art for a low bit rate video encoder using both overlapping block motion compensation and zerotree wavelet coding.

SUMMARY OF THE INVENTION

The present invention is an apparatus and a concomitant method of encoding video frame sequences (input images) using overlapping block motion compensation in conjunction with zerotree wavelet coding. The method partitions each input image into a plurality of overlapping blocks and applies wavelet transform on the partitioned input image. Various optional quantization processes can be selectively applied to determine an optimal quantizer scale for each wavelet coefficient. Zerotree coding is optionally applied to selectively prune the wavelet coefficients. Finally, the quantized coefficients are encoded into a bitstream.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
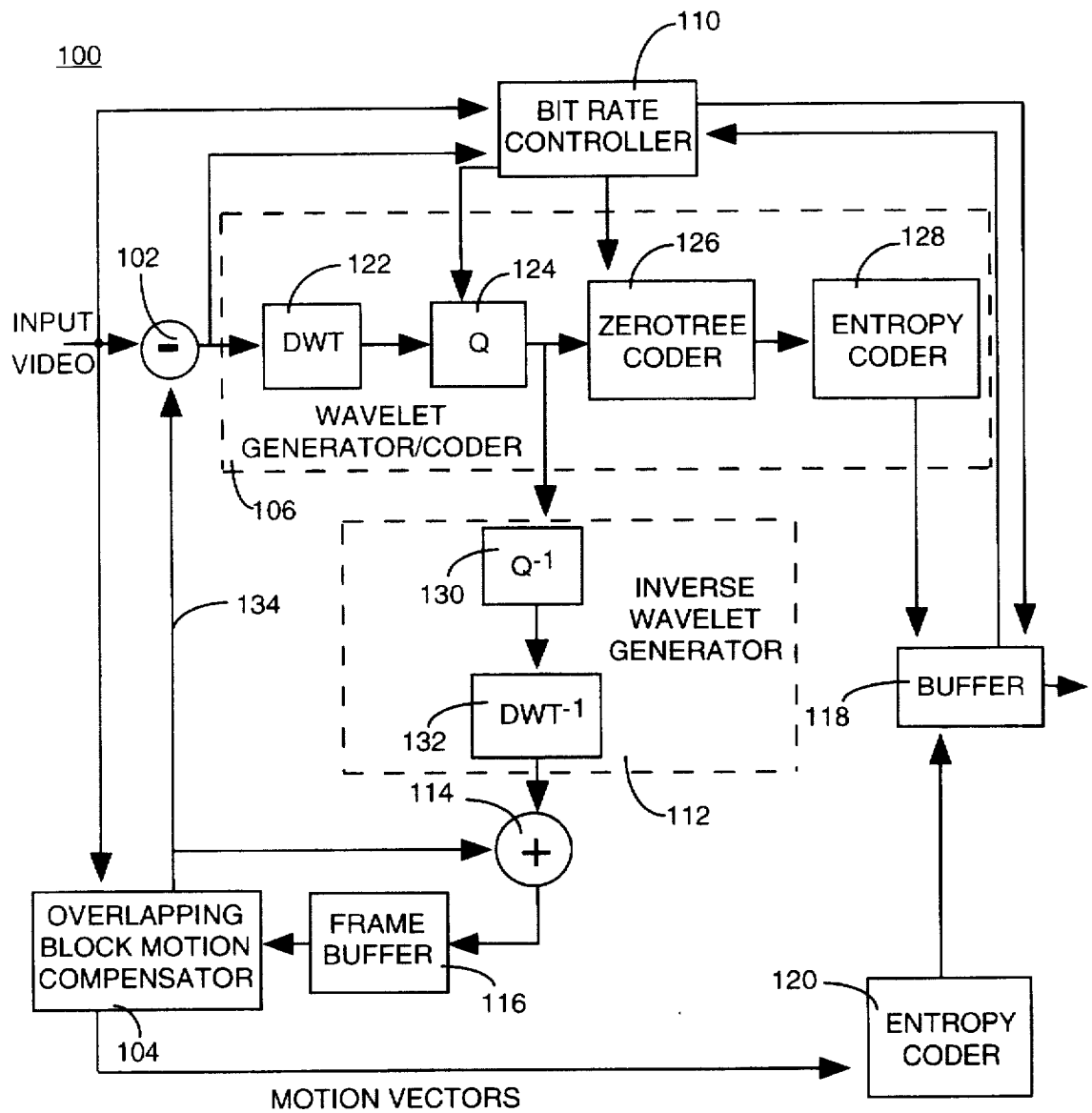
FIG. 1 depicts a block diagram of an encoder of the present invention.

FIG. 1 depicts an encoder 100 that incorporates the teachings of the present invention. The encoder contains an overlapping block motion compensator (OBMC) 104, subtractor 102, wavelet generator/coder 106, bit rate controller 110, inverse wavelet generator 112, summer 114, frame buffer 116, output buffer 118 and entropy coder 120.

In general, the input is a video image (a two-dimensional array of pixels (pels) defining a frame in a video sequence). To accurately transmit the image through a low bit rate channel, the spatial and temporal redundancy in the video frame sequence must be substantially reduced. This is generally accomplished by coding and transmitting only the differences between successive frames. The encoder has three functions: first, it produces a plurality of motion vectors that represent motion that occurs between frames; second, it predicts the present frame using a reconstructed version of the previous frame and the motion vectors; and third, the predicted frame is subtracted from the present frame to produce a frame of residuals that are coded and transmitted along with the motion vectors to a receiver. Within the receiver, a decoder reconstructs each video frame using the coded residuals and motion vectors.

Specifically, the present input image is sent to the bit rate controller 110, the subtractor 102 and the OBMC 104. The OBMC partitions the image into a plurality of overlapping macroblocks, i.e., preferably, as shall be discussed below, into polygonal-shaped blocks of pixels. The macroblocks in the present image are compared to a previously transmitted input image. Typically, the previously transmitted input image is a previous frame in the video sequence, but it may be a frame from some other portion of the sequence. The OBMC generates motion vectors representing motion that has occurred between the previous frame and the present frame. The motion vectors are coded by the entropy coder 120 such as a Huffman coder and sent to buffer 118 for ultimate transmission to a receiver. These motion vectors are then applied to the previously processed image to produce a predicted image. Although the OBMC is illustrated as a single module, those skilled in the art will realize that the functions performed by the OBMC can be implemented using separate modules, e.g., a motion estimation module and a motion compensation module.

Figure 2:
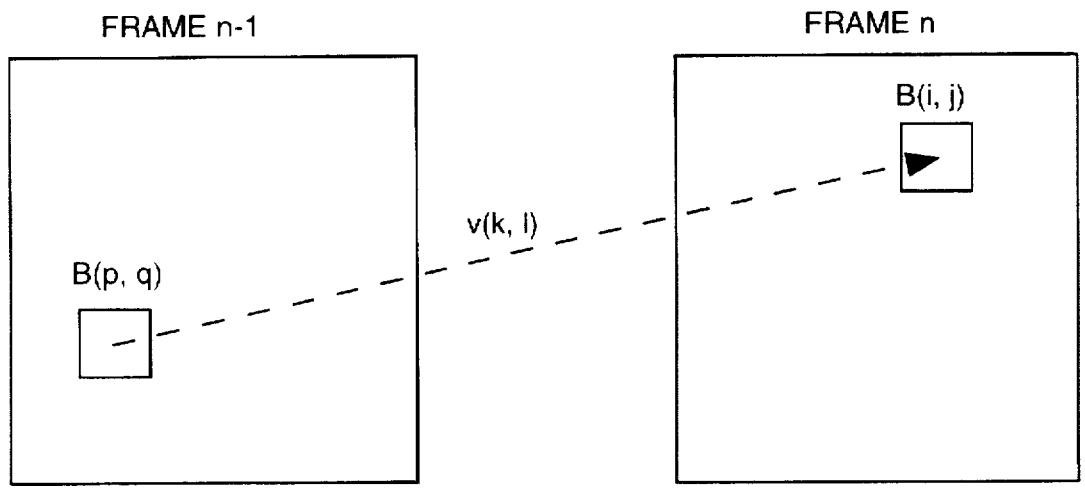
FIG. 2 illustrates motion vector utilization in a BMC technique.

More specifically, motion compensation algorithms are employed to reduce the temporal redundancy of video sequences. In a conventional motion compensation scheme, the input signal is segmented into non-overlapped blocks. Using a block matching criteria such as sum absolute difference, one block from the previous frame is chosen as the best predication for each block of the current frame. A motion vector is also obtained to represent the prediction operation. FIG. 2 shows the conventional block matching motion compensation (BMC). In this figure, the best match for the block (i,j) of frame n is found to be block (p,q) of frame n−1:

$$\hat{B}(n,i,j) = B(n-1,i-k,j-l) \quad (1)$$

The distance between these blocks is shown by vector v=(k,l). Therefore, with the given previous frame, the current frame of the input signal can be represented by a motion vector field and a motion compensated residual (MCR) frame. The MCR frame is obtained by differencing the current frame and the predicted frame:

$$R(n,i,j) = B(n,i,j) - \hat{B}(n,i,k) \quad (2)$$

For compression efficiency, the motion vector field and MCR frame can be compressed instead of the entire current input frame. All operations in block matching motion compensation are accomplished on a block-by-block basis. As these operations are applied to each block independently, the neighboring motion vectors are not always the same. Consequently, a BMC-type system produces discontinuities (in the form of blocking edges) in MCR frames. Such discontinuities are difficult to code and can use a substantial number of coding bits.

In conventional block based coding schemes, a block-based transform such as DCT is applied to the MCR frames. Generally, the same block segmentation size and shape used for motion compensation, is also used for the transform computation. Therefore, the discontinuities of the MCR frames do not reduce the coding efficiency. However, these blocking edges increase the blocking effects in the decoded sequence. If, instead of DCT, a global transform such as a wavelet transform is applied to the MCR frames, the blocking edges generated by the BMC are transformed. In the transformed domain, these edges are represented with large magnitude coefficients in high frequencies and therefore reduce the coding efficiency. The transformed discontinuities also produce the blocking effects in the decoded sequence. Therefore, an effective reduction of the blocking edges is required to improve the quality of the coding when using a wavelet transform.

Figure 3:
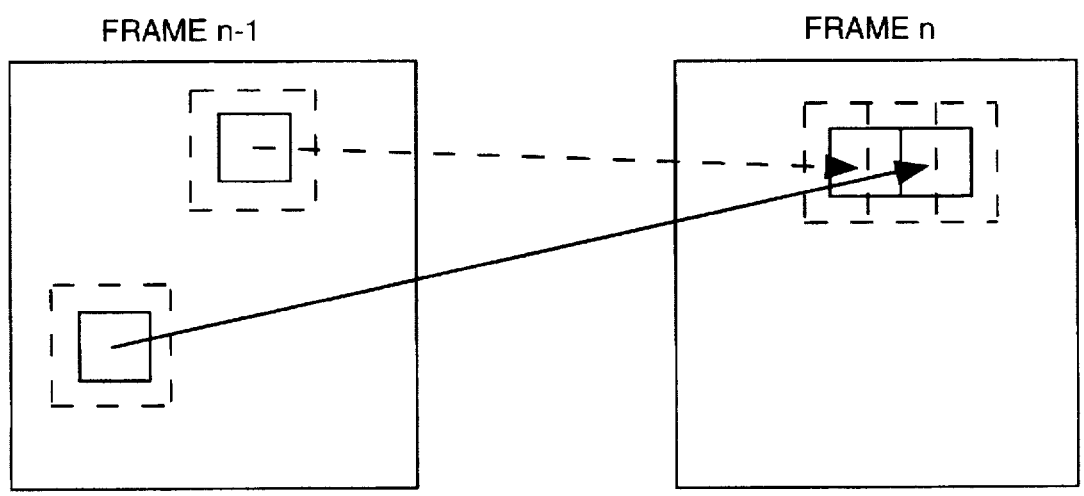
FIG. 3 illustrates motion vector utilization in a OBMC technique.
Figure 4:
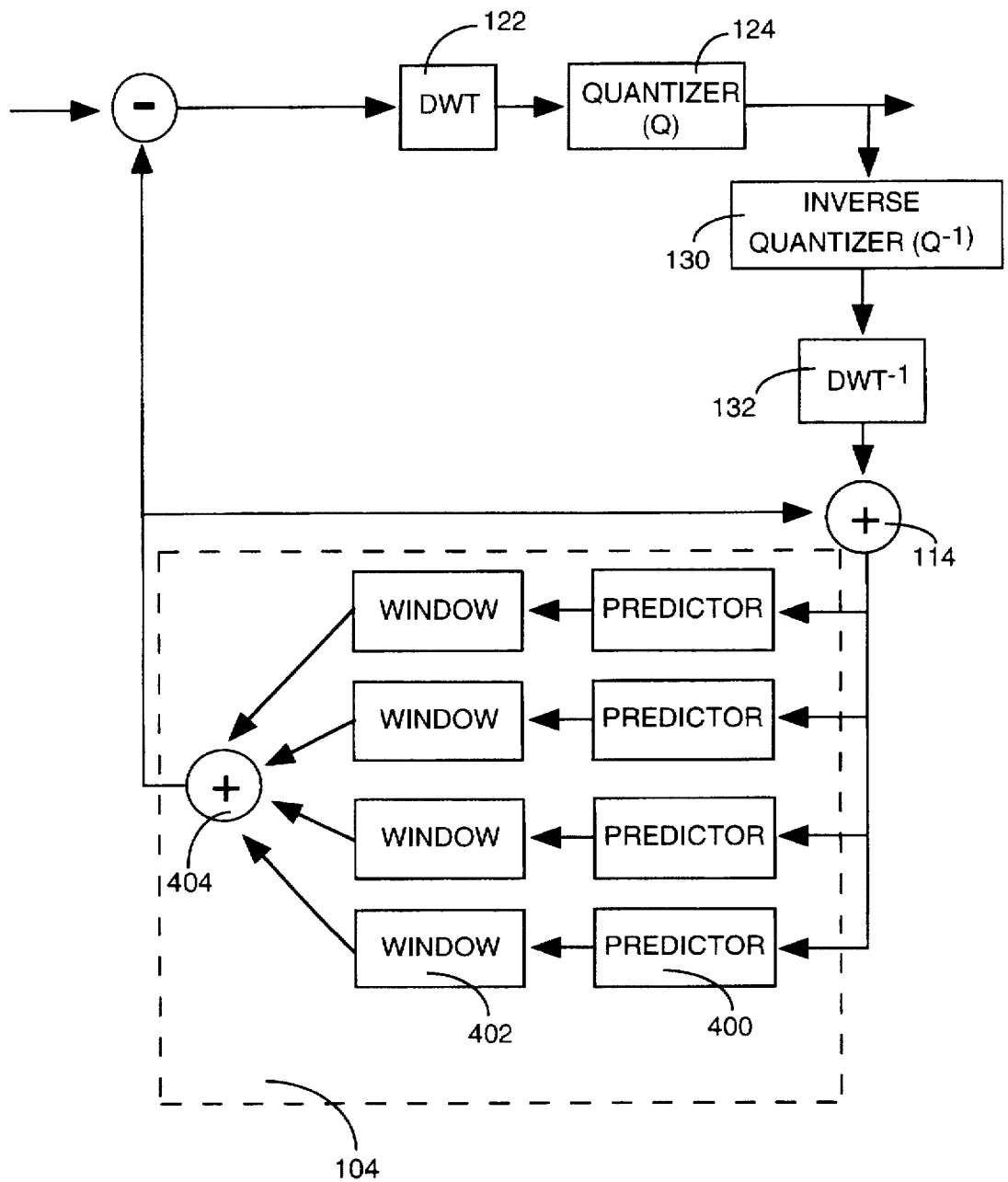
FIG. 4 depicts detailed block diagram of an overlapping block motion compensator used in the present invention.

One elegant solution for reducing the discontinuities, is to overlap the blocks in the motion compensation process, i.e., an overlapped block motion compensation (OBMC) approach. FIG. 3 depicts motion compensated blocks translated by motion vectors, where the blocks overlap one another. Specifically, each compensated block overlaps its eight neighboring blocks. A window function is also employed for motion compensation of the overlapped regions. In this figure, a block B(ij) of frame n is obtained by:

$$B(n,i,j) = \sum_k \sum_l W(k,l) \times B(n-1, i-k, j-l) \quad (3)$$

where W(k,l) is the matrix representing the window function and x represent element by element product-sum operation. FIG. 4 depicts a detailed block diagram of the OBMC 104 containing a plurality of predictors 400 and a plurality of windows 402. Each predictor 400 is connected in series with a window 402 and all the predictor/window combinations are connected in parallel to summer 114. The output of each of the windows 402 are connected to summer 404. In operation, multiple blocks from previously reconstructed frames produced by the predictors 402 are windowed and added together in order to obtain a block for the motion compensated frame. Even if two neighboring motion vectors are not the same, the discontinuities between the corresponding motion compensated blocks are eliminated because of the overlap between adjacent blocks. It has been shown that even though overlapping the motion compensated blocks might introduce some unnecessary distortion to some blocks, it significantly improves the efficiency of inter frame coding when using the wavelet transform. The optimal window shape is a function of the spatial correlation of the input signal. It has also been shown that the trapezoid or raised-cosine shape windows are near-optimal for sequences that commonly appear in video-phone applications such as sequences depicting the head and shoulders of a caller.

Figure 5:
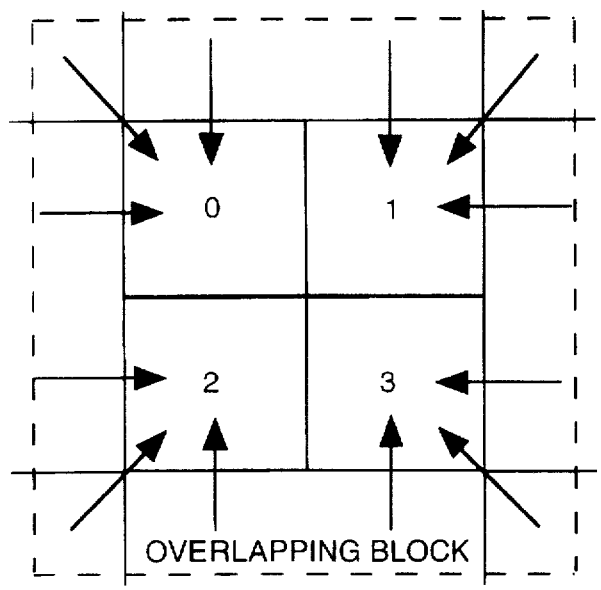
FIG. 5 illustrates quadrilateral OBMC blocks.

The present invention uses an overlapping block motion compensation approach that uses quadrilateral overlap as shown in FIG. 5. In this approach, each block is divided into four quarters, each of which overlaps with three different quarters of the neighboring blocks. The raised-cosine window function is also chosen for overlapping the blocks:

$$W(i,j) = w(i)w(j) \quad (4)$$

$$w(i) = \frac{1}{256} \sin^2 \frac{\pi(i + .5)}{16} \quad (5)$$

for a window of size 16×16 and i=0, 1, ..., 15. It has been observed that the performance of the quality of the wavelet coder is significantly improved when the OBMC is employed rather than BMC. As an example, in the coding of 200 frames of the "mother-daughter" sequence, at the rate of 25 Kbits/sec, the average signal-to-noise ratio (SNR) has improved by 0.5 dB by using OBMC in lieu of BMC.

Note that in BMC, each block is predicted independently of the other blocks. The predication quality of each block in an OBMC scheme is affected by the neighboring motion vectors. In most overlapping schemes in the prior art, these vectors are still estimated independently. One further step for improvement of the OBMC scheme is to consider the effects of each motion vector in the predication of neighboring blocks. One approach uses an iterative algorithm for estimation of motion vectors. An iterative approach has been shown that 2 or 3 iterations of motion estimation can reduce the prediction error up to 15% percent.

Figure 6:
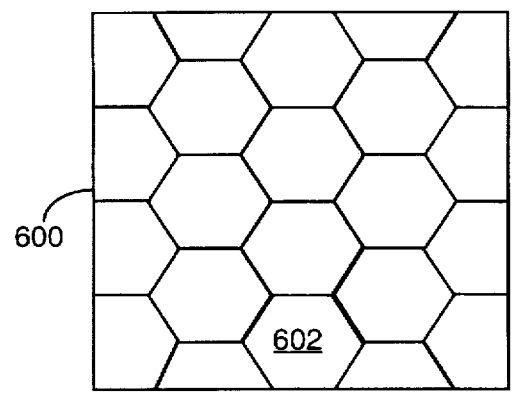
FIG. 6 depicts an input image that has been partitioned into polygonal shaped blocks.

Preferably, the blocks defined by the OBMC are polygonal in shape, e.g., having a hexagonal shape. The hexagonal shape more closely represents human visual properties than a square block. As such, the use of hexagonal blocks reduces visual blocking effect. Additionally, hexagonal blocks form a better representation of human visual properties. FIG. 6 depicts a illustrative input frame 600 that has been partitioned into a plurality of non-overlapping hexagonal blocks 602.

Figure 7:
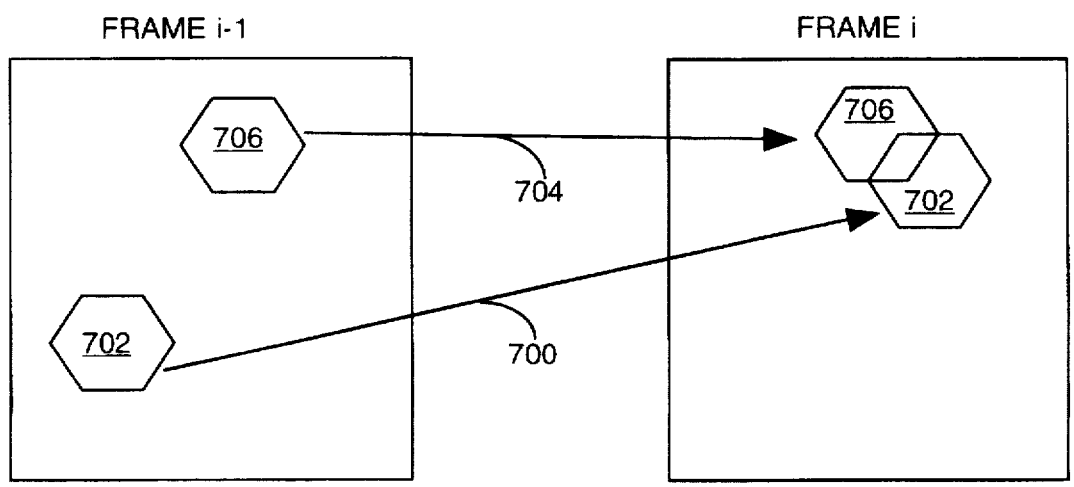
FIG. 7 illustrates motion vector utilization in a OBMC technique that uses the polygonal shaped blocks of FIG. 6.

FIG. 7 depicts an illustrative motion vector 700 that relates block 702 in frame i to block 702 in frame i−1 and depicts an illustrative motion vector 704 that relates block 706 in frame i to block 706 in frame i−1. Each motion vector ensures that the blocks overlap one another.

Once the motion vectors are available, they are used to produce the predicted frame (on path 134 in FIG. 1). The predicted frame is, in turn, used to produce an MCR frame. Subtractor 102 subtracts, pixel-by-pixel, the predicted frame from the present input frame. The result is a frame of motion compensated residuals (an MCR frame).

The wavelet generator/coder 106 processes the residuals using a conventional discrete wavelet transform algorithm and a zerotree coding and quantization technique. The wavelet generator/coder contains a discrete wavelet transform (DWT) block 122, a quantizer (Q) 124, a zerotree coder 126 and an entropy coder 128. A detailed discussion of a wavelet generator/coder is disclosed in U.S. Pat. No. 5,412,741 issued May 2, 1995 and incorporated herein by reference. An alternative zerotree encoder is disclosed in provisional application Ser. No. 60/007,012, filed Oct. 25, 1995, Attorney Docket Number 11908 (converted into U.S. patent application Ser. No. 08/736,114, filed Oct. 24, 1996, Attorney Docket Number DSRC 11908) and also incorporated herein by reference.

The inverse wavelet generator 112 contains an inverse quantizer ($Q^{-1}$) 130 and an inverse DWT ($DWT^{-1}$) block 132. As such, the inverse wavelet generator attempts to reconstruct the MCR frame that forms the input to the wavelet generator/coder. This reconstructed frame of residuals is combined, in summer 114, with the predicted image to provide an estimation of the present input image. This image is stored in the frame buffer 116 to be used as the previous image by the OBMC when generating the new predicted frame for the next input frame.

Figure 8:
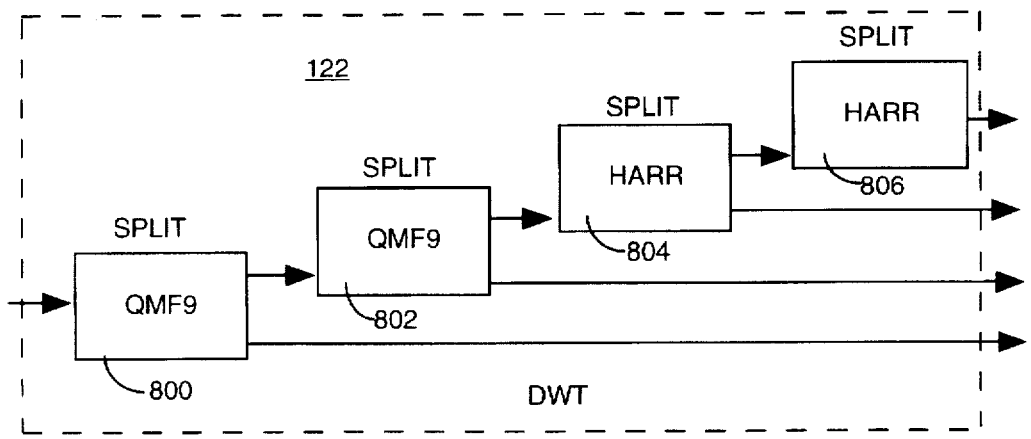
FIG. 8 illustrates a four stage tree structure for implementing the DWT of the present invention.
Figure 9:
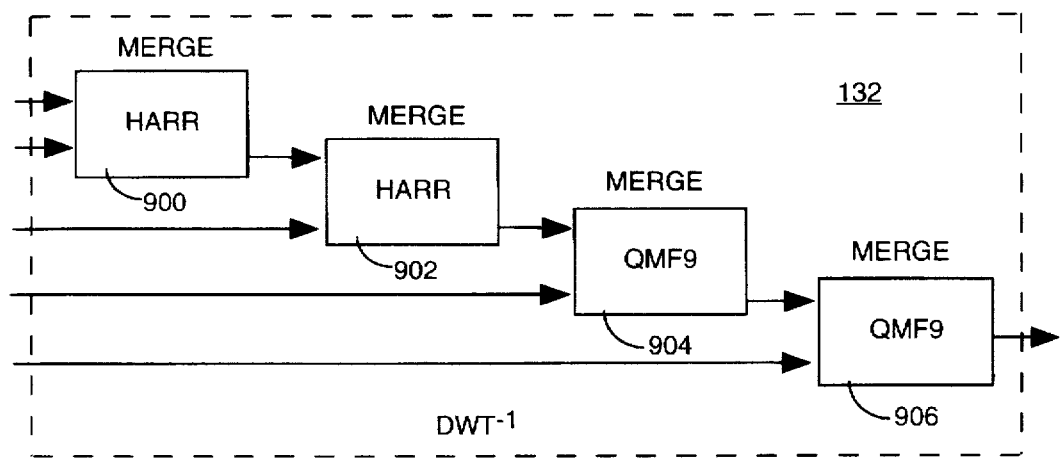
FIG. 9 illustrates a four stage tree structure for implementing the inverse DWT of the present invention.
Figures 10, 11:
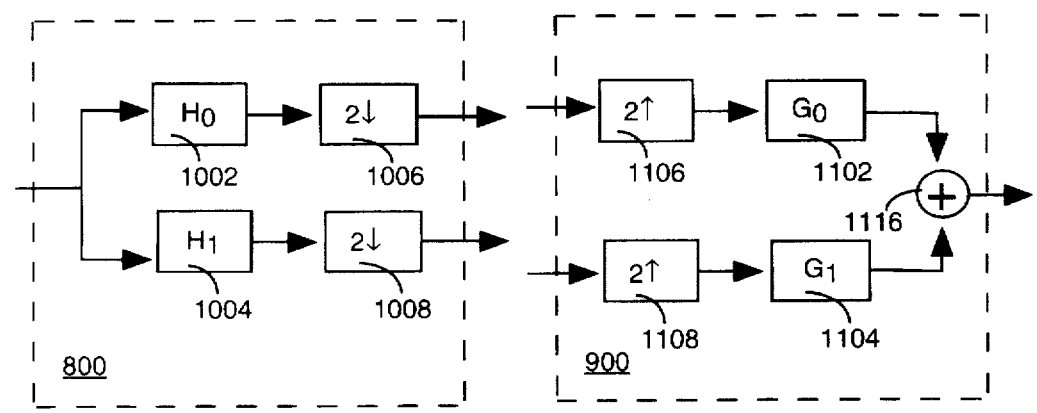
FIG. 10 depicts a block diagram of one filter of the DWT shown in FIG. 8.
FIG. 11 depicts a block diagram of one filter of the inverse DWT shown in FIG. 9.

FIGS. 8 through 11 depict the multi-staged filter structure of the discrete wavelet transform (DWT). The DWT 122 is usually implemented using an octave-band tree structure containing a plurality of filters 800, 802, 804, and 806. Each stage (filter stage) of the tree structure is a 2-band decomposition and only the low frequency band of this 2-band system is further decomposed. For example, FIG. 10 depicts a detailed block diagram of one stage 800 (in one-dimension) of the DWT of FIG. 8. The stage 800 contains a low band filter 1002 and a high band filter 1004. Each filter is followed by a downsampler 1006 and 1008 that subsamples the filtered image.

FIGS. 9 and 11 depict the inverse DWT 132 implemented in a similar structure using the corresponding two-band synthesis sections 900, 902, 904, and 906. Each stage contains two upsamplers 1106 and 1108 followed by a low band filter 1102 and a high band filter 1104. The output signals from the filters are added in summer 1116. If the basic two-band system provides perfect reconstruction, the DWT is invertible. The desired DWT can be obtained by designing the two-band filter bank with the required properties.

Similar to the 1-D case, multidimensional discrete wavelet transforms are usually implemented in the form of hierarchical tree structures of filter banks. Each stage of the tree structure is a multidimensional filter bank. The generalization of filter bank to multiple dimensions is straightforward for the separable case. Separable filter banks are those which use both separable filters and separable down-upsampling functions. The implementation of separable filter banks is very efficient due to the fact that the decomposition is applied in each dimension separately. Although separable filter banks do not necessarily maximize the coding gain of the transform for a given image, their performance in a wavelet structure is very near optimal for natural images. Therefore, the preferred embodiment of the invention uses separable filter banks in the implementation of the 2-D wavelet transform. The subband decomposition is first applied to the rows and then the columns of pixels within an image. Therefore, using a simple recursive routine, the input image can be decomposed into four subimages in each recursion. Although the preferred embodiment of the invention uses separable filters, an alternative embodiment uses non-separable filters or a combination of separable and non-separable filters.

One important parameter is the choice of filters in the DWT. To facilitate image compression, the need of linear filters is well known since without linear phase, the phase distortion around edges is very visible. Therefore, the invention uses linear phase filters only. Orthogonality is another issue in the filter bank. Since the decorrelation of the subband signal is a desired property in compression system, the invention uses orthogonal or near-orthogonal filter banks. Perfect reconstruction property is another important characteristic of the filter bank. So, the invention uses a near perfect reconstructing filter bank, because at low bit rates, the reconstruction error is negligible compared to the quantization errors. As for the size of filters, long filters usually tend to spread coding noise. Therefore, the use of long filters in low-bit rate coding systems results in ringing effects around sharp edges. Thus, when the invention is used in an application that uses very low bit rates, the invention generally uses short filters, although they might not have very good stop band rejection. Hence, the filters used in the invention have a length of 12-taps or less.

To demonstrate the practicality of using different filter types for different wavelet subbands, the invention was used to code the mother-daughter sequence with two different sets of wavelets: namely, two QMF9 filters and two Harr filters (See FIGS. 8–11). It was expected that the Harr wavelet would perform better on MCR frames because of its superior time-resolution compared to the QMF9 wavelet. It turned out that the overall quality of the decoded inter frame is in fact better when the Harr wavelet is used. The improvement in luminance SNR is about 0.17 dB for the mother-daughter sequence. The use of Harr filters reduces the ringing artifacts around the edges and therefore improves the subjective quality of the decoded sequence significantly. Although this transform is more blocky than the QMF9.

In the present invention, the wavelet transform is applied to the motion compensated residual (MCR) frames. Then, wavelet tree coding is applied to the coefficients within a wavelet tree representation of each MCR frame.

Returning to FIG. 1, the discrete wavelet transform 122 is followed by a quantizer 124 that quantizes the wavelet transform coefficients. The quantizer is followed by a zerotree coder 126 and an entropy coder 128 which losslessly code the quantized coefficients. The discrete wavelet transform is a lossless and reversible process that does not yield any compression but prepares the data for the subsequent compression stages. Substantial compression, and therefore loss, occurs in the quantizer. The zerotree and entropy coders that follow the quantizer form a lossless compression stage that is used to encode the quantized coefficients with as few bits as possible.

The first embodiment of the present invention uses the Embedded Zerotree Wavelet (EZW) encoding process to perform the combined operations of wavelet transform, quantization, and zerotree/entropy coding. A detailed description of an EZW encoder can be found in U.S. Pat. No. 5,412,741 issued May 2, 1995 and incorporated herein by reference. A second (alternative) embodiment of the invention uses a different form of zerotree encoder that is disclosed in U.S. provisional patent application Ser. No. 60/007,012, filed Oct. 25, 1995, Attorney Docket Number 11908, entitled "APPARATUS AND METHOD FOR ENCODING ZEROTREES GENERATED BY A WAVELET-BASED CODING TECHNIQUE" (converted into U.S. patent application Ser. No. 08/736,114, filed Oct. 24, 1996, Attorney Docket Number DSRC 11908), which is herein incorporated by reference. Each form of wavelet tree encoder is discussed below.

After computing the wavelet transform, the EZW process continues by simultaneously quantizing coefficients, building zerotrees of the coefficients, and entropy coding the zerotrees and the coefficient values using an arithmetic coder. This is accomplished iteratively, where the quantization becomes finer, and therefore coding quality improves after each iteration. The iterations continue until the bit allocation for a particular frame is exhausted. The bit allocation is set by the bit rate controller 110 of the inventive encoder.

Figure 12:
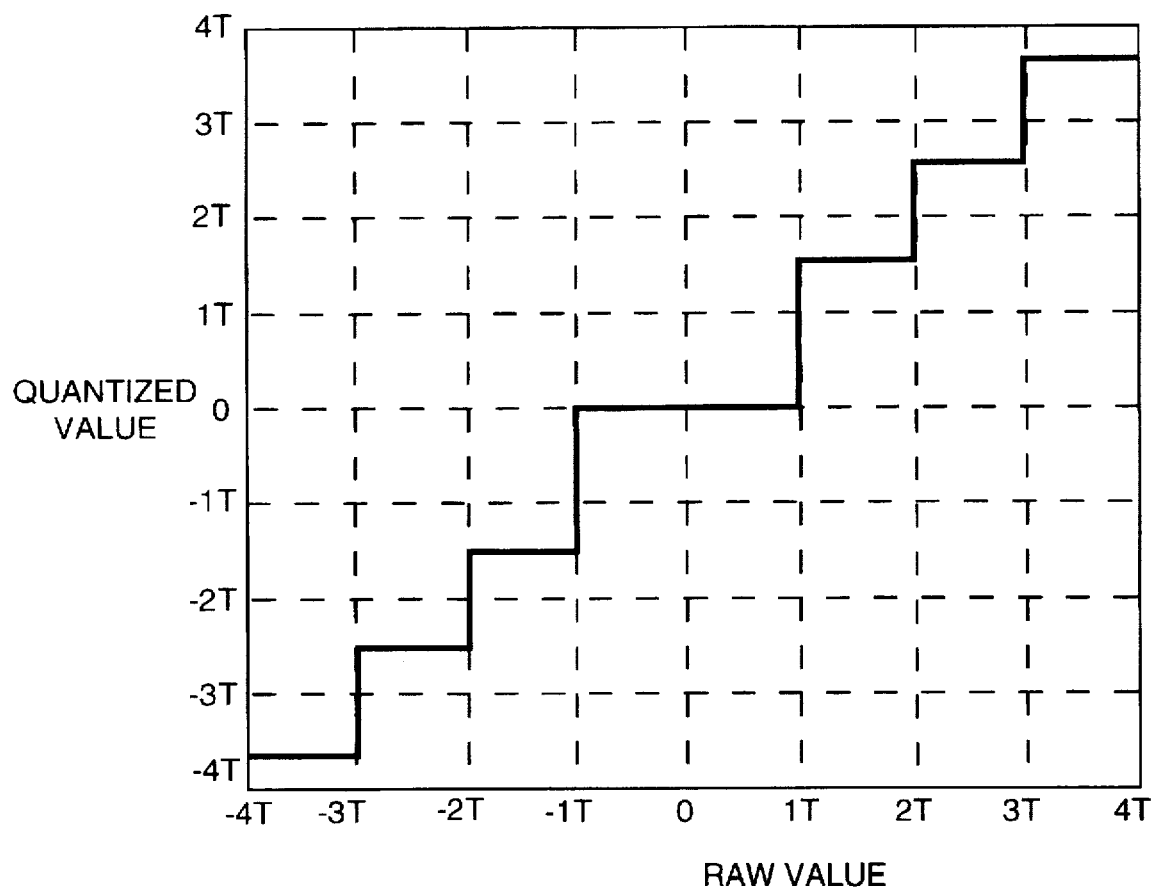
FIG. 12 depicts a mid-riser, uniform quantizer with a dead zone around zero.

The quantization that is implemented by EZW can be characterized as a family of quantizers, each of which is a mid-riser uniform quantizer with a dead zone around zero. An illustrative example of such a quantizer is plotted in FIG. 12. After each iteration of the EZW process, all coefficients will have been effectively quantized by using one of these quantizers. As the algorithm proceeds through the next iteration, the effective quantization for each coefficient becomes that of the next finer quantizer in the family of quantizers until, at the end of the iteration, the quantization of all coefficients is that of this new quantizer. If the bit allocation is used up at the end of an iteration, all coefficients will have been quantized according to the same quantizer. It is more likely, however, that the bit allocation is exhausted before an iteration is completed, in which case the final effective quantization for each coefficient will be according to one of two quantizers, depending upon where in the scan of coefficients the algorithm stops.

Each iteration of the EZW process is characterized by a threshold, and the quantizer effectively implemented is a function of that threshold. As the iterations proceed, the threshold decreases and the quantization becomes finer. All thresholds are powers of two. The initial threshold $T_d$ is set at that power of two such that the magnitude of at least one coefficient lies between $T_d$ and $2*T_d$, and no coefficient has a magnitude greater than $2*T_d$. As each coefficient with magnitude c is processed by this iteration, its quantized magnitude $c_q$ becomes:

$$c_q = \begin{cases} int[c/T_d] * T_d + T_d/2 & \text{if } c \geq T_d \\ 0 & \text{otherwise} \end{cases} \quad (6)$$

where int[] means "take the integer part of".

After this iteration, a new threshold $T_s$ is used, where $T_s=T_d/2$. Coefficients are scanned again, and become quantized according to:

$$c_q = \begin{cases} int[c/T_s] * T_s + T_s/2 & \text{if } c \geq 2T_s \\ 0 & \text{otherwise} \end{cases} \quad (7)$$

Notice that the only difference between this quantizer and the first one is that the dead zone around zero extends to the threshold in the first quantizer but to twice the threshold in the second.

After this iteration, the threshold $T_d$ is again used, where here $T_d$ is set to $T_d=T_s$. Coefficients are scanned again, and become quantized according to Equation 6. After that iteration, $T_s$ is set and Equation 7 applies. This changing of quantizers continues until the bit allocation for the frame is exhausted.

To encode the quantized coefficients, EZW uses a structure called a zerotree to order the coefficients followed by an arithmetic coder to do the actually encoding. The zerotree and arithmetic coder work together to losslessly compress the quantized coefficients to their entropy. The zerotree is regrown with each iteration of EZW so that it reflects the current state of quantization of the wavelet coefficients. There is a node in the tree for each wavelet coefficient. In U.S. Pat. No. 5,412,741, one of four symbols describes the coefficient at that node: POSITIVE SIGNIFICANT, NEGATIVE SIGNIFICANT, ZEROTREE ROOT, or ISOLATED ZERO. The zerotree coding yields compression because the ZEROTREE ROOT symbol is used to prune the tree, i.e., the branch extending form the ZEROTREE ROOT is not coded. Such pruning enables the invention to limit the number of coefficients that must be coded, thereby saving many bits.

Alternatively, in U.S. provisional patent application Ser. No. 60/007,012 (Attorney Docket 11908) (converted into U.S. patent application Ser. No. 08/736,114, filed Oct. 24, 1996, Attorney Docket Number DSRC 11908), the zerotree encoder uses a depth first pattern for traversing the zerotree, i.e., each branch of the tree, from parent to child to grandchild and so on, is fully traversed before a next branch is traversed. The depth first tree traversal pattern is used to quantize the coefficients of the tree as well as to assign symbols to the quantized coefficients without using an iterative process such as that used in the EZW approach. Quantization can be accomplished with any quantization method that produces discrete values from a continuous wavelet coefficient value. Such quantization processes include the mid-riser quantizer of FIG. 12. Additionally, this zerotree encoder assigns one of three symbols to each node: ZEROTREE ROOT, VALUED ZEROTREE ROOT, and VALUE. As with the EZW approach, the zerotree coding yields compression because the ZEROTREE ROOT symbol is used to prune the tree, i.e., the branch extending form the ZEROTREE ROOT is not coded. Such pruning enables the invention to limit the number of coefficients that must be coded, thereby saving many bits.

The arithmetic (entropy) coder 126 that follows the zerotree coder is used to actually encode the remaining symbols and the bits of the quantized coefficients. An arithmetic coder is an entropy coder that can encode a stream of symbols at their entropy. An arithmetic coder is similar to a Huffman coder, but can outperform the Huffman coder because the arithmetic coder can assign fractional bits to the symbols and because the arithmetic coder can adapt more quickly to changing symbol statistics than the Huffman coder.

The particular arithmetic coder used is a direct implementation of the coder developed by Witten, Neal, and Cleary. A full description of the coder can be found in Witten et al., "Arithmetic Coding For Data Compression," Communications of the ACM, Vol. 30, No. 6, pp. 520–540, June 1987. The coder operates by assigning bits to symbols according to a model of the probabilities of the symbols. An adaptive model is used which means that the probabilities are computed as the symbols are encountered in the encoding process. In this way, the data is encoded in as few bits as possible and can still be decoded because the decoder can build the same model as the encoder and track the probabilities. By using an adaptive model, the arithmetic coder adapts to the changing statistics of the signal as the encoding proceeds.

The bit rate controller 110 monitors the input image, the buffer 118 status, the status of the entropy coder 120, and the residuals to determine an optimal quantizer scale for the quantizer 124. Control of the quantizer scale controls the ultimate number of bits that are used to code a given image frame.

Bit allocation involves decisions about how to spend the available bitrate when compressing a video sequence. Bit allocation is accomplished for two reasons in video compression. First, it is used to regulate the number of bits produced during compression. In this case, bit allocation is sometimes referred to as bit rate control. Bit rate control is important for maintaining the desired bit rate, as well as for maintaining the proper fullness in any buffers in the encoder. Second, bit allocation is used to regulate the quality of the compressed video, so as to achieve the best possible decompressed video. In this context, "best" is the decompressed video that is best suited for the purpose for which it will be used. Often, decompressed video is simply used for viewing by people, with no particular task in mind. In this case, "best" simply means "looks the best to a human observer." In other cases, however, it may be that one spatio-temporal section of the video is more important than other sections. For example, in the video-telephone application, the face is usually important, and the background is less important. In this case, "best" means the decompressed video that yields the best looking face, with much less consideration given to the quality of the background. The definition of "best" for the application of interest should be integrated into the bit allocation scheme.

There are several levels at which bit allocation can be exercised. At the highest level, bit allocation for video deals with the trade-off between spatial quality and temporal quality. This trade-off is made by varying the number of frames/second (f/s). This type of bit allocation is frame rate control. As an example, say for a given bit rate, X bits/second (b/s), one chose to use Y f/s. This would result in an average of X/Y=Z bits/frame (b/f) allocated for representing each compressed frame. Instead, say that for the same bit rate X b/s, one chose to use Y/2 f/s. This would result in an average of 2*Z b/f allocated for representing each compressed frame. In the first case, a larger portion of the bitrate is being spent to represent the temporal information in the video sequence (more f/s, fewer b/f). In the second case, a larger portion of the bitrate is being spent to represent spatial information in the video sequence (fewer f/s, more b/f). Achieving the best balance, as measured by decompressed video quality, between f/s and b/f is the goal of frame rate control. The best balance between f/s and b/f at any particular moment in time depends strongly on the spatial and the temporal complexity of the video at that moment in time. For video with relatively small amplitude motion, few f/s are needed to render the motion smoothly. On the other hand, for video with relatively large amplitude motion, a relatively larger number of f/s are needed in order to represent the motion smoothly.

At the next level, bit allocation deals with the division of the available bits among frames, in order to equalize spatio-temporal quality between those frames. This is "inter-frame" bit allocation. Since spatio-temporal complexity can vary widely from frame to frame, different frames might require different portions of the available bits, in order to achieve even quality among the frames. The allocation of bits for a particular frame will depend strongly on the spatio-temporal complexity of that frame. Note that inter-frame bit allocation can be achieved by continuously varying the frame rate. However, even for a fixed frame rate, different allocations of bits for different frames in the video sequence may be desired.

At the lowest level, bit allocation involves decisions about the allocation of the available bits within a frame, in order to equalize quality spatially across the frame. This is "intra-frame" bit allocation. Since the spatial complexity of a frame can vary widely depending on spatial location, different parts of a frame might require different portions of the available bits, in order to achieve even quality across the frame. As with inter-frame bit allocation, for intra-frame bit allocation, the best allocation of bits for a particular spatial location in a frame depends strongly on the spatial complexity of the frame at that location.

One bit allocation approach that can be used in the invention is a basic first-pass technique. To control spatial quality, the invention uses variable spatial amplitude quantization. In this basic approach, the bit rate and frame rate are specified when the encoder is run; and they are fixed throughout the encoding of the sequence. By fixing the frame rate and the bit rate, the invention also fixes the number of bits per frame. For each frame, the encoder selects a quantizer scale for that frame that will produce exactly the number of bits allocated for the frame (the same number of bits for every frame). In this way, the quantizer scale only varies from frame to frame.

In order to balance spatial and temporal quality in the decompressed video, the invention can use a frame rate control approach to augment the bit rate control approach discussed above. To facilitate the frame rate control approach, measures are needed for spatial and temporal complexity. The temporal complexity measure takes into account the amplitude of the motion vectors for a frame (or set of frames), as well as higher-order statistics of the motion vector field(s). The temporal complexity measure also includes statistics associated with the motion-compensated prediction error for a frame (or set of frames). The spatial complexity measure uses statistics from the source video frame(s), as well as statistics from the motion-compensated prediction error frame(s). These statistics are computed separately over different spatio-temporally localized regions in the frame(s), or over entire frame(s). Similar spatial and temporal complexity measures are also used to determine inter-frame bit allocation.

In order to equalize quality within a frame, the invention uses an intra-frame bit allocation approach which uses spatial amplitude quantization to regulate spatial quality. For intra-frame bit allocation, spatial segmentation of the frame is performed. This segmentation takes into account two different types of information. First, the video data is classified based on relative importance for the application. Re-using a previous example, the face in a video-telephone sequence may be segmented from the background, and compressed with more fidelity (using a larger proportion of the bits allocated to the frame). The segmentation also takes into account human visual system properties, and classify image regions based on the degree to which compression artifacts are masked in those regions. This segmentation information is also used to determine inter-frame bit allocation.

Although the present invention operates, as described above, using a conventional wavelet transform, other, more exotic, wavelet transform and coding processes are available and are within the scope of the present invention. For example, wavelet packets can be used as a substitute for the convention wavelet transform. Wavelet packets differ from conventional wavelets in that bands other than the low band can be further decomposed. In a conventional wavelet transform, which is typically implemented as an octave-based filter bank, the signal is split into two bands (high and low) and then the low band is split again into a high and low band and so on. This form of filter structure is shown in FIG. 8. In a wavelet packet implementation, the high band output, instead of the low band output, can be split into a low band and a high band. Additionally, both low and high band outputs are split into low and high bands for each. This form of filter structure leads to various combinations of splitting of the bands at each stage.

Figure 13:
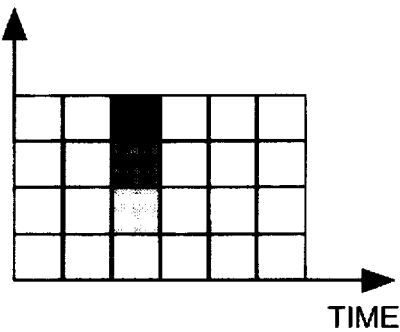
FIG. 13 depicts a time-frequency tiling in a full wavelet packet transform.
Figure 14:
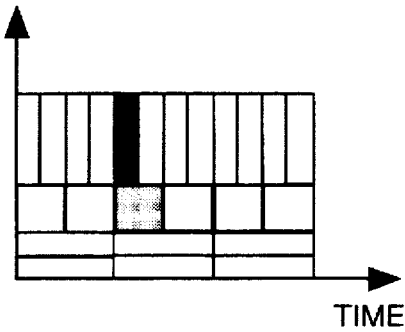
FIG. 14 depicts a time-frequency tiling in a wavelet transform.
Figure 15:
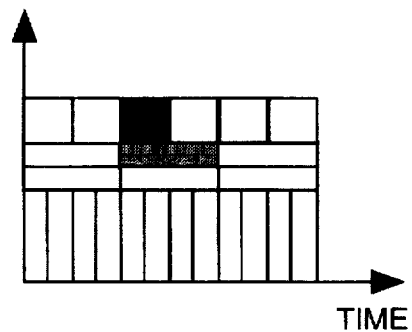
FIG. 15 depicts a time-frequency tiling in a wavelet packet transform.
Figure 16:
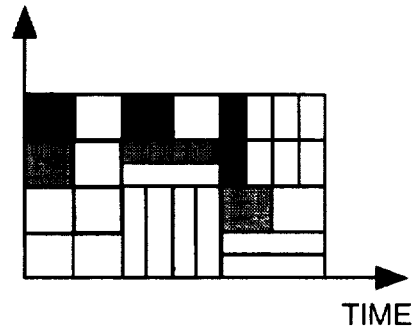
FIG. 16 depicts a time-frequency tiling in an adaptive wavelet packet transform.

This flexibility provides a wide range of possible decompositions, each of which has a different time-frequency tiling and therefore different time-frequency localization. One trivial case is the decomposition of both bands in each stage of tree structure, which is equivalent to a uniform filter bank. By using different splittings, a transform can achieve different tilings of the time-frequency plane. Four examples of complex time-frequency tiling are depicted in FIGS. 13–16. Where FIG. 13 depicts a time-frequency tiling in a full wavelet packet transform; FIG. 14 depicts a time-frequency tiling in a wavelet transform; FIG. 15 depicts a time-frequency tiling in a wavelet packet transform; and FIG. 16 depicts a time-frequency tiling in an adaptive wavelet packet transform.

In the embedded zerotree coding approach, each child can have only one parent. That means the zero-tree coding scheme cannot be directly applied to the general wavelet packet decomposition, because in a wavelet packet a child may have multiple parents. In one embodiment of the invention, the invention uses a restricted wavelet packet decomposition in which, each child can have only one parent. Note that in this embodiment, unlike the conventional wavelet transform, the parent may contain higher frequency coefficients of the signal. Using different adaptive approaches for each given MCR frame, one can find the best (restricted) wavelet packet of that frame and then apply the embedded zero-tree coding to the wavelet packet coefficients. The 'best' transform is the one in which most significant samples are gathered in a few coarse bands. The invention can use one of two different criteria for wavelet packet decomposition of the MCR. The first criterion is the energy of the subband. In this embodiment of the invention, in each stage of the tree structure the subband containing more energy than the other subbands is further decomposed. Experimental results have shown that such adaptive decomposition results in a coding quality improvement. The second criterion is the pre-threshold energy. In this approach, each subband is first clipped by a constant threshold and then the energies of the subbands are compared to one another. Experimental results have shown an improvement in coding quality over the original wavelet transform.

Although various embodiments which incorporate the teachings of the present invention have been shown and described in detail herein, those skilled in the art can readily devise many other varied embodiments that still incorporate these teachings.

What is claimed is:

1. Apparatus for encoding an input image which is partitioned into a plurality of overlapping blocks, said apparatus comprising:

an overlapping block motion compensator for computing a plurality of motion vectors for said plurality of overlapping blocks and for generating a predicted image using said plurality of motion vectors;

a wavelet transform module, coupled to said overlapping block motion compensator, for applying a wavelet transformation to a difference signal between the input image and said predicted image, where said wavelet transformation produces a plurality of coefficients;

a quantizer, coupled to said wavelet transform module, for quantizing said plurality of coefficients; and a coder, coupled to said quantizer, for coding said plurality of quantized coefficients.

2. The apparatus of claim 1, wherein said plurality of overlapping blocks are polygonal-shaped blocks.

3. The apparatus of claim 2, wherein said polygonal-shaped blocks are hexagonal blocks.

4. The apparatus of claim 1, wherein each of said plurality of overlapping blocks is generated by applying a window function.

5. The apparatus of claim 4, wherein said window function is a trapezoidal shaped window.

6. The apparatus of claim 1, wherein said overlapping block motion compensator comprises:

a plurality of predictors for predicting a plurality of non-overlapping blocks;

a plurality of windows, where each of said plurality of window is coupled in series to one of said plurality of predictors, for windowing said plurality of non-overlapping blocks; and a summer, coupled to said plurality of windows, for adding said plurality of windowed non-overlapping blocks to produce an overlapping block.

7. The apparatus of claim 1, wherein said wavelet transform module comprises a plurality of separable filters that are organized in a tree structure having a plurality of wavelet subbands.

8. The apparatus of claim 7, wherein said plurality of filters comprises different types of filters which are selectively applied to different wavelet subbands of said tree structure.

9. The apparatus of claim 1, further comprising:

a rate controller, coupled to said quantizer, for selecting a quantizer scale for each of said plurality of coefficients.

10. The apparatus of claim 9, wherein said quantizer scale for each coefficient is iteratively selected to meet a bit allocation.

11. The apparatus of claim 9, wherein said quantizer scale for each coefficient is iteratively selected in accordance with a threshold.

12. The apparatus of claim 1, wherein said wavelet transform module applies a wavelet packet transform.

13. The apparatus of claim 12, where said wavelet packet transform employs a wavelet packet decomposition that is responsive to an energy level of a subband.

14. The apparatus of claim 1, further comprising a zerotree coder, coupled to said quantizer, for selectively pruning said plurality of quantized coefficients.

15. Method for encoding an input image which is partitioned into a plurality of overlapping blocks, said method comprising the steps of:

computing a plurality of motion vectors for said plurality of overlapping blocks;

generating a predicted image using said plurality of motion vectors;

applying a wavelet transformation to a difference signal between the input image and said predicted image, where said wavelet transformation produces a plurality of coefficients;

quantizing said plurality of coefficients; and encoding said plurality of quantized coefficients.

16. The method of claim 15, wherein said plurality of overlapping blocks are polygonal-shaped blocks.

17. The method of claim 15, wherein each of said plurality of overlapping blocks is generated by applying a window function.

18. The method of claim 15, wherein said wavelet transform applying step applies selectively different types of filtering to different wavelet subbands resulting from said wavelet transform.

19. The method of claim 15, further comprising the step of:

iteratively selecting a quantizer scale for each of said plurality of coefficients to meet a bit allocation.

20. The method of claim 15, wherein said wavelet transform applying step applies wavelet packet transform.

* * * * *

UNITED STATES PATENT AND TRADEMARK OFFICE
CERTIFICATE OF CORRECTION

PATENT NO. : 5,764,805

DATED : June 9, 1998

INVENTOR(S) : Stephen Anthony Martucci, Iraj Sodagar, Ya-Qin Zhang

It is certified that error appears in the above-identified patent and that said Letters Patent is hereby corrected as shown below:

On the title page, item [73]

Assignee: David Sarnoff Research Center, Inc.
Princeton, NJ; and

Sharp Corporation
Tenri, Japan

Signed and Sealed this

Sixth Day of June, 2000

Attest:

Q. TODD DICKINSON

*Attesting Officer*

*Director of Patents and Trademarks*